United States Patent
Pai et al.

(10) Patent No.: US 12,536,613 B2
(45) Date of Patent: Jan. 27, 2026

(54) METHOD AND SYSTEM WITH IMAGE SUPER-RESOLUTION

(71) Applicant: SAMSUNG ELECTRONICS CO., LTD., Suwon-si (KR)

(72) Inventors: Priyadarshini Panemangalore Pai, Bengaluru (IN); Shashishekara Parampalli Adiga, Bengaluru (IN); Prashant Pandurang Shinde, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 18/529,286

(22) Filed: Dec. 5, 2023

(65) Prior Publication Data

US 2024/0185385 A1    Jun. 6, 2024

(30) Foreign Application Priority Data

Dec. 6, 2022  (IN) ............................. 202241070354
Aug. 16, 2023  (KR) ......................... 10-2023-0106943

(51) Int. Cl.
  *G06T 3/40* (2024.01)
  *G06T 3/4046* (2024.01)
  (Continued)

(52) U.S. Cl.
  CPC .......... *G06T 3/4076* (2013.01); *G06T 3/4046* (2013.01); *G06T 5/50* (2013.01); *G06T 2207/20081* (2013.01)

(58) Field of Classification Search
  CPC ....... G06T 3/4076; G06T 3/4046; G06T 5/50; G06T 2207/20081; G06T 3/4053
  (Continued)

(56) References Cited

U.S. PATENT DOCUMENTS 7,447,382 B2 * 11/2008 Nestares ............... G06T 3/4053
                                                            358/3.26
10,545,099 B1    1/2020 Chen et al.
(Continued)

FOREIGN PATENT DOCUMENTS

CN    113610713 A    11/2021

OTHER PUBLICATIONS

Indian Office Action Issued on Jul. 15, 2025, in Counterpart Indian Patent Application No. 202241070354 (7 Pages in Hindi and in English).

(Continued)

*Primary Examiner* — Neil R Mclean
(74) *Attorney, Agent, or Firm* — NSIP Law (57) ABSTRACT

A method and system for screening a plurality of images for performing super-resolution (SR) are provided. The method includes using a multitask learning model (MLM) determining at least one of a plurality of image properties related to each of a plurality of images having a resolution lower than a predefined threshold; and selecting, based on the at least one of the plurality of image properties, a first set of images among the plurality of images to each be respectively suitable for upscaling; recommending, using a recommendation model, at least one parameter based on the at least one of the plurality of image properties; and generating at least one super-resolution image by respectively performing a super-resolution upscaling operation on at least one image of the first set of images based on the at least one parameter and the at least one of the plurality of image properties.

19 Claims, 5 Drawing Sheets

(51) Int. Cl.
*G06T 3/4076* (2024.01)
*G06T 5/50* (2006.01)

(58) Field of Classification Search
USPC .......................................................... 382/299
See application file for complete search history.

(56) References Cited

U.S. PATENT DOCUMENTS

| | | |
|---|---|---|
| 10,949,964 B2 | 3/2021 | Pandey et al. |
| 2002/0171051 A1 | 11/2002 | Nakagaki et al. |
| 2014/0084159 A1 | 3/2014 | Yaeshima et al. |
| 2019/0114742 A1 | 4/2019 | Wang |
| 2020/0013155 A1* | 1/2020 | Putman ................ G06V 10/993 |
| 2021/0073945 A1 | 3/2021 | Kim et al. |
| 2021/0224966 A1 | 7/2021 | Putman et al. |
| 2021/0295469 A1 | 9/2021 | Ratner et al. |
| 2021/0343001 A1 | 11/2021 | Grama et al. |
| 2022/0068599 A1 | 3/2022 | Shavit et al. |

OTHER PUBLICATIONS

Trager-Cowan, C., et al., "Scanning Electron Microscopy as a Flexible Technique for Investigating the Properties of UV-Emitting Nitride Semiconductor Thin Films," Photonics Research, vol. 7, No. 11, Nov. 2019, (10 Pages in English).

* cited by examiner

METHOD AND SYSTEM WITH IMAGE SUPER-RESOLUTION

CROSS-REFERENCE TO RELATED APPLICATIONS

This application claims the benefit under 35 USC § 119(a) of Indian Patent Application No. 202241070354 filed on Dec. 6, 2022, in the Indian Patent Office, and Korean Patent Application No. 10-2023-0106943 filed on Aug. 16, 2023, in the Korean Intellectual Property Office, the entire disclosures of which are incorporated herein by reference for all purposes.

BACKGROUND

1. Field

The following description relates to a method and system with image super-resolution (SR).

2. Description of Related Art

The semiconductor manufacturing industry is advancing towards smaller technology nodes. To ensure high productivity, manufacturing industries typically deploy high precision artificial intelligence (AI)-based defect inspection techniques using imaging techniques. These imaging techniques have the potential to capture minute topographical features and chemical composition of imaging samples such as semiconductor wafers. However, obtaining high-resolution images using these imaging techniques is a cumbersome task in terms of acquisition time, image storage in a device memory, and manual intervention for identification of regions of interest (ROI) and defects. In contrast, low-resolution images are less intensive on resources but may cause poor defect detectability because they capture information with fewer details. State-of-the-art AI inspection models incorporate super-resolution (SR) models, for synthetically generating high-resolution images using low-resolution images, which eliminates the need for vast real image acquisition times without adversely impacting detectability. The AI models, because of inherent training in stringent conditions, although vastly generalizable, are dependent on input quality and parameters (e.g., resolution, scale, noise level, etc.) in order to generate desirable prediction outputs. For example, different images of semiconductor wafers taken at different resolutions, scales, and noise levels may reflect different features corresponding to the ROI and one SR model with a set upscale factor, such as $2x/4x$, may not provide high-quality super-resolved images. The output of image SR models may be adversely affected when input images are of poor quality. The output of image SR models may also be affected when minimum resolution required for image SR is not available.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes a multitask learning model (MLM): determining at least one of a plurality of image properties related to each of a plurality of images having a resolution lower than a predefined threshold; and selecting, based on the at least one of the plurality of image properties, a first set of images among the plurality of images to each be respectively suitable for upscaling; recommending, using a recommendation model, at least one parameter based on the at least one of the plurality of image properties; and generating at least one super-resolution image by respectively performing a super-resolution upscaling operation on at least one image of the first set of images based on the at least one parameter and the at least one of the plurality of image properties.

The plurality of image properties may include image scale information, defect information, defect classification, a noise quotient, and a region of interest (ROI).

The selecting further may include respectively selecting each image of the first set of images in response to a corresponding value of the at least one of the plurality of image properties being greater than a predetermined threshold.

The at least one parameter may include an upscale factor.

The method may further include training the MLM using a training dataset comprising the plurality of image properties and a set of low-resolution test images.

The recommending using the recommendation model may further include recommending at least one image analysis model based on the at least one of the plurality of image properties; and recommending the at least one parameter by performing in-depth analysis on the at least one image of the first set of images or the generated at least one super-resolution image, using the recommended at least one image analysis model to determine a characteristic of an object in the at least one image of the first set of images.

In another general aspect, a system for screening a plurality of images for performing super-resolution includes one or more processors configured to execute instructions; and one or more memories storing the instructions, wherein the execution of the instructions configures the one or more processors to: use a multitask learning model (MLM): determine at least one of a plurality of image properties related to each of a plurality of images having a resolution lower than a predefined threshold; and select, based on the at least one of the plurality of image properties, a first set of images among the plurality of images to be respectively suitable for upscaling; recommend, using a recommendation model, at least one parameter based on the at least one of the plurality of image properties; and generate, using a super-resolution model, at least one super-resolution image respectively through performance of a super-resolution upscaling operation on at least one image among the first set of images based on the at least one parameter and the at least one of the plurality of image properties.

The one or more processors may be further configured to respectively select each image of the first set of images in response to a corresponding value of the at least one of the plurality of image properties being greater than a predetermined threshold.

The system may further include a training model configured to train the MLM using a training dataset comprising the plurality of image properties and a set of low-resolution test images.

The one or more processors may be further configured to recommend at least one image analysis model based on the at least one of the plurality of image properties; and recommend the at least one parameter by performing in-depth analysis on at least one image of the first set of images or the generated at least one super-resolution image, using the recommended at least one image analysis model to determine a characteristic of an object in the at least one image of the first set of images.

In another general aspect, an electronic device includes one or more processors configured to execute instructions; and one or more memoiesy configured to store the instructions, wherein the execution of the one or more processors configures the one or more processors to determine at least one of a plurality of image properties related to each of a plurality of captured images having a resolution lower than a predefined threshold; select a first set of images from the plurality of images based on the at least one of the plurality of image properties; recommend at least one image analysis model and at least one parameter, based on the at least one of the plurality of image properties; and generate super-resolution images by respectively performing a super-resolution unscaling operation on only the first set of images, where the first set of images includes less than all of the plurality of images, based on the at least one parameter and the at least one of the plurality of image properties.

In one embodiment, a non-transitory computer-readable storage medium storing instructions may, when executed by a processor, cause the processor to perform the method.

Other features and aspects will be apparent from the following detailed description, the drawings, and the claims.

Throughout the drawings and the detailed description, unless otherwise described or provided, it may be understood that the same drawing reference numerals may refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. It is to be understood that if a component (e.g., a first component) is referred to, with or without the term "operatively" or "communicatively," as "coupled with," "coupled to," "connected with," or "connected to" another component (e.g., a second component), it means that the component may be coupled with the other component directly (e.g., by wire), wirelessly, or via a third component.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

For screening a plurality of images for performing super resolution (SR), when the images do not contain ROIs such as defective regions, the images may be eliminated from the SR pipeline to avoid generating unreliable or unnecessary high-resolution images. Thus, image screening for SR including estimation of scale and defect class information may be helpful in facilitating accurate and reliable predictions. However, training and using separate models for scale prediction, defect identification, denoising, ROI prediction, and the like may require vast amounts of data and effort. Since high-resolution images consume relatively much larger device memory, their overall storage and deployment for individual machine learning/deep learning (ML/DL) model development may become highly resource intensive. Also, for some related tasks, inputs, image processing, and feature extraction are redundant processes requiring unnecessary separate training.

Moreover, downstream in-depth defect analysis, which largely depends on input quality and generated SR images, is not selectively streamlined. This may affect the reliability of information obtained from prediction models and defect detection pipeline altogether.

As a non-limiting example, one or more embodiments may include a method and system that use a multitask learning model to select images suitable for SR and perform SR based on image properties, which may include parallelizing of the screening process, minimizing latency and memory usage, providing reliable SR, saving time and reducing manual intervention.

Figure 1:
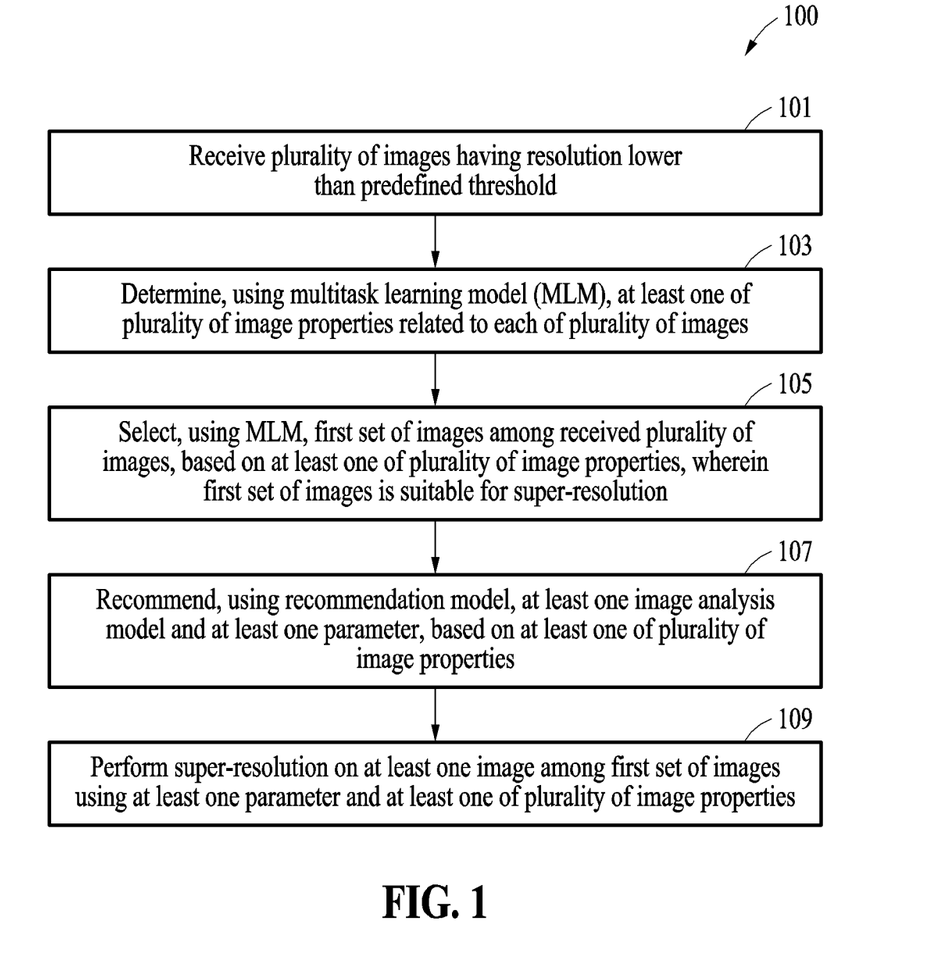
FIG. 1 illustrates an example method of screening a plurality of images for performing super-resolution (SR) according to one or more embodiments.
Figure 2:
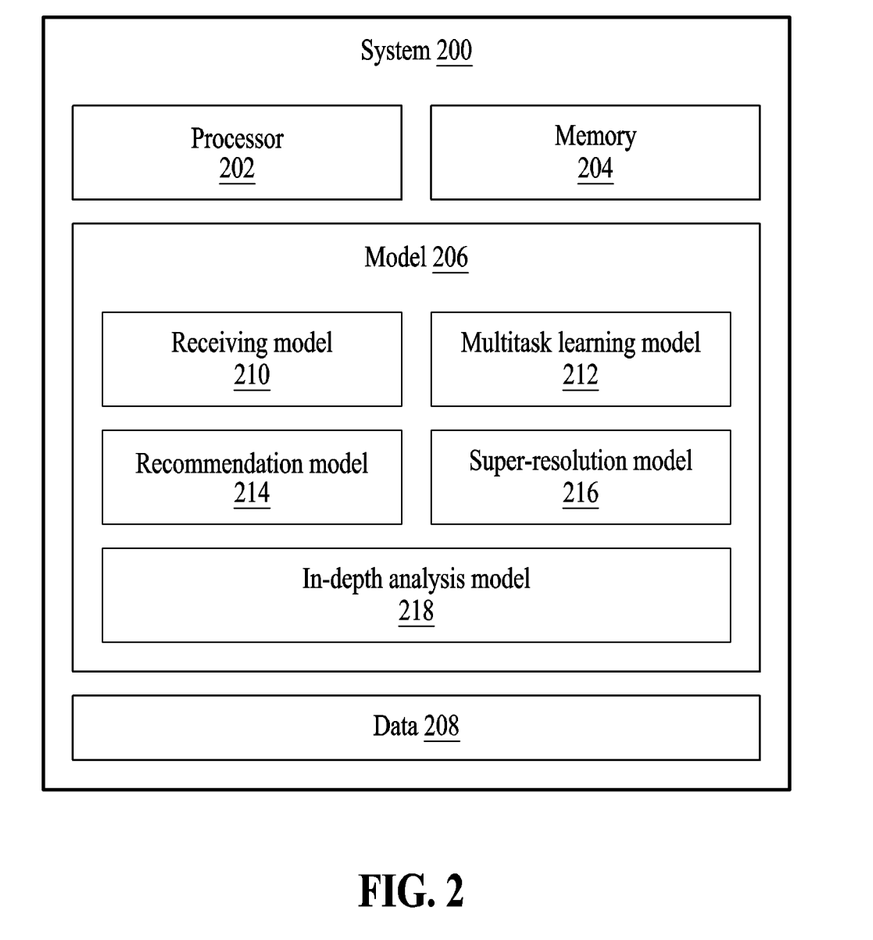
FIG. 2 illustrates an example system for screening a plurality of images for performing SR according to one or more embodiments.
Figure 3:
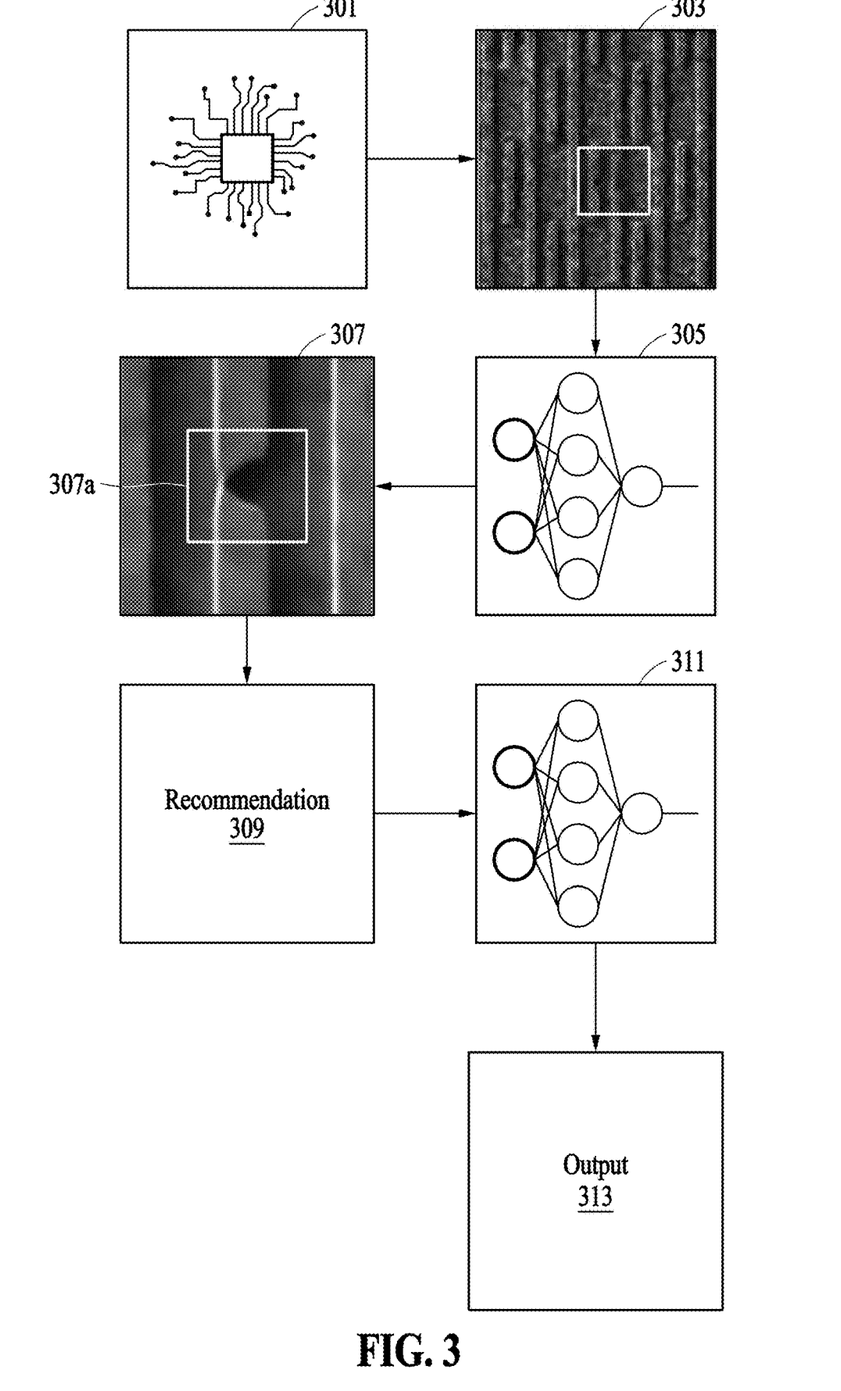
FIG. 3 illustrates an example of screening a plurality of images for performing SR according to one or more embodiments.
Figure 4:
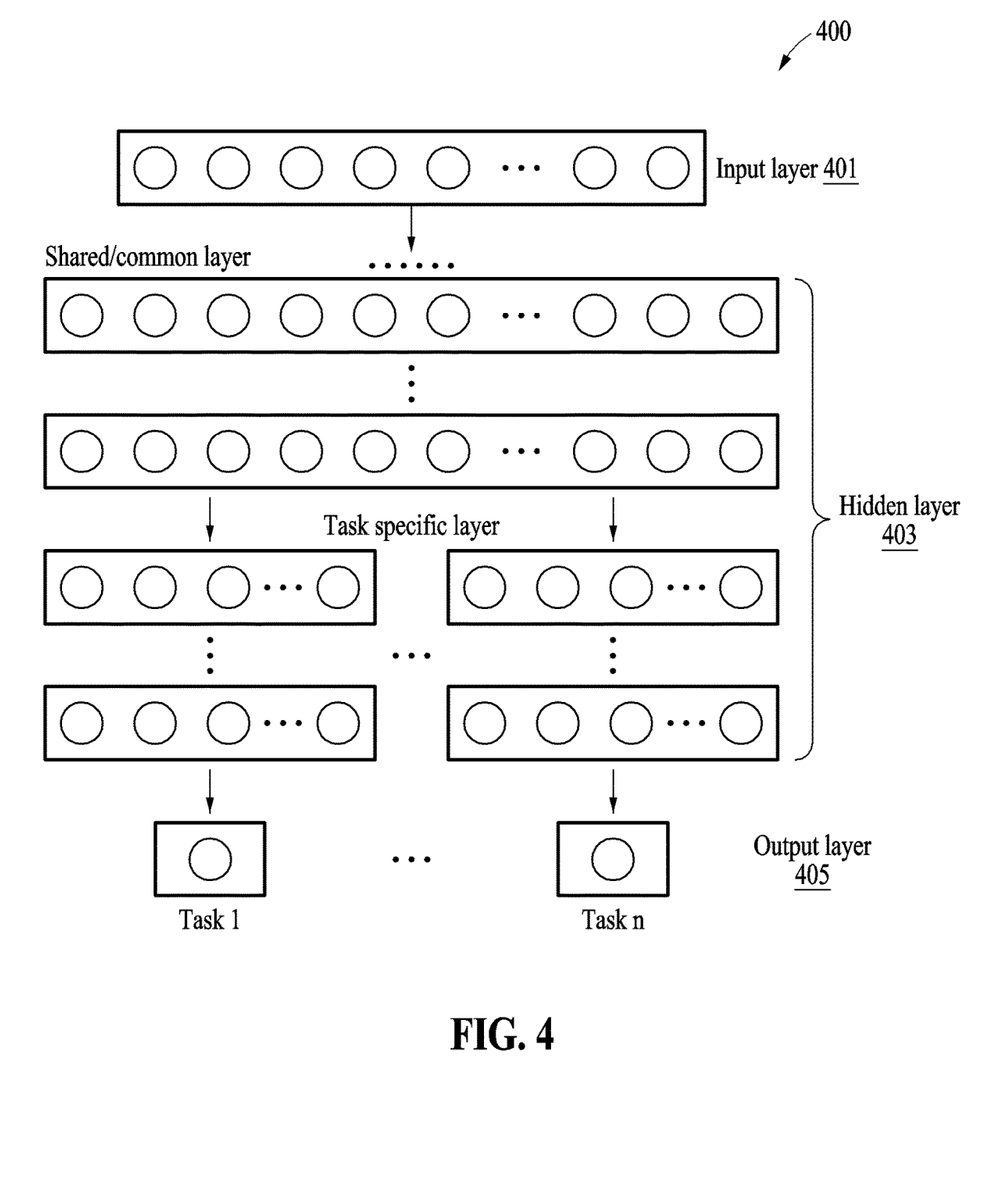
FIG. 4 illustrates an example architecture of a multitask model according to one or more embodiments.

FIG. 1 illustrates an example method of screening a plurality of images for performing super-resolution (SR). FIG. 2 illustrates an example system for screening a plurality of images for performing SR. FIG. 3 illustrates an example of screening a plurality of images for performing SR. FIG. 4 illustrates an example architecture of a multitask model. For brevity, the descriptions of FIGS. 1-4 are provided together.

Referring to FIG. 2, a system 200 may include a processor 202, a memory 204, models 206, and a data 208, but examples are not limited thereto. The models 206 may also be representative of one or more, or respective, processors, and memory, or such operations that may be implemented by processor 202, e.g., based on instructions and models stored in memory 204. Similarly, data 208 may also be representative of one or more, or respective, memories, e.g., with respective to the models 206. The models 206 and the memory 204 may be connected to the processor 202.

The processor 202 may be a single processing element or several processing elements, all of which may include multiple hardware computing components. The processor 202 may be implemented as one or more microprocessors, microcomputers, microcontrollers, digital signal processors, central processing units, state machines, logic circuits, and/or any electronic devices that manipulate signals based on operational instructions. Among other functions, the processor 202 may be configured to fetch and execute computer-readable instructions and data stored in the memory 204.

The memory 204 may include any non-transitory computer-readable medium known in the art including, as non-limiting examples, volatile memory, such as static random access memory (SRAM) and dynamic random access memory (DRAM), and/or non-volatile memory, such as read-only memory (ROM), erasable programmable ROM, flash memory, hard disks, optical disks, and magnetic tape.

As noted, the models 206 may include routines, programs, objects, components, and data structures that perform predetermined tasks or implement data types. The models 206 may also be representatively of, or implemented as, processor(s), state machine(s), logic circuits, and/or any other electronic devices or components that manipulate signals based on operational instructions.

Furthermore, the models 206 may be implemented in hardware, instructions executed by one or more processors, or by a combination thereof. The one or more processors may include a computer, a processor, such as the processor 202, a state machine, a logic array, or any other suitable electronic devices capable of processing instructions. The one or more processors may execute instructions to cause the one or more processors to perform required tasks, or the one or more processors may be dedicated to performing required functions. In an example, the models 206 may be machine-readable instructions (software) which, when executed by the one or more processors, perform any of the described functions.

In an example, the models 206 may include a receiving model 210, a multitask learning model (MLM) 212, a recommendation model 214, an SR model 216, and an in-depth analysis model 218.

These various models 210 through 218 may communicate with each other. In an example, the models 210 through 218 may be implemented as or by a part of the processor 202, and the processor 202 may be configured to perform the functions of the models 210 through 218. The data 208 may serve as a repository for storing data processed, received, and/or generated by one or more of the models 210 through 218.

In an example, the system 200 may be a part of an automated defect review system. In another example, the system 200 may be connected to the automated defect review system. The term "automated defect review system" refers to any system, e.g., used for identifying defects in a semiconductor wafer.

Although the present disclosure is described with reference to a scanning electron image (SEM) technique, the examples of the present disclosure may also be used in other imaging techniques such as transmission electron imaging (TEM), X-ray diffraction analysis (XRD), or any other suitable imaging techniques.

Referring to FIG. 1, in operation 101, a method 100 may include receiving a plurality of images having a resolution lower than a predefined threshold. In an example, the plurality of images may be SEM images. A receiving model (e.g., the receiving model 210) may receive the plurality of images from a semiconductor inspection model (e.g., a semiconductor inspection model 301 in FIG. 3). As illustrated in FIG. 3, a block 303 may represent a single image having a resolution lower than the predefined threshold. It should be noted that the receiving model 210 may receive the plurality of images from any hardware device capable of inspecting a semiconductor wafer and acquiring an image from the semiconductor wafer. Furthermore, it should be noted that the predefined threshold may be configured and depend on the type of wafer and/or image to be inspected and/or scanned.

Thereafter, in operation 103, the method 100 may include determining, using a multitask learning model (MLM), at least one of a plurality of image properties related to each of the plurality of images. A non-limiting example of an MLM is described in detail with reference to FIG. 4, which illustrates an example architecture of an MLM 400. As illustrated in FIG. 4, the MLM 400 may include a plurality of layers, such as one or more input layers 401, one or more hidden layers 403, and one or more output layers 405. In an example, the MLM 400 may include any number of layers that may be less or more than the layers illustrated in FIG. 4. As illustrated in FIG. 4, the one or more hidden layers 403 may include one or more shared/common layers and one or more task specific layers. In an example, the MLM 400 may be trained by receiving a plurality of training datasets at the one or more input layers 401. The plurality of training datasets may include a set of low-resolution test images and a plurality of image properties related to each of low-resolution test images. In an example, at the time of training the MLM 400, the plurality of training datasets may be received at one input layer. Similarly, at the time of implementing the MLM 400, the plurality of images may be received at one input layer. In an example, at the time of training the MLM 400, the plurality of training datasets may be received at more than one input layer. Similarly, at the time of implementing the MLM 400, a plurality of inputs, such as images, audio data, and video data, may be received at more than one input layer. The MLM 400 may refer to the MLM 212 of FIG. 2 and an MLM 305 of FIG. 3. The one or more hidden layers 403 may train the MLM 400 based on the plurality of inputs received at the one or more input layers 401 and provide an output at the one or more output layers 405. In an example, the MLM 400 may provide at least one of a plurality of image properties related to each of the plurality of images (referred to as, "Task 1", . . . , "Task n" in FIG. 4) at the one or more output layers 405.

Referring back to FIG. 1, in operation 103, the plurality of image properties may include image scale information, defect information, defect classification, a noise quotient, and a region of interest (ROI). For example, image scale information may include information related to the scale of an image, such as when the scale of the image is 1 micrometer (μm). Similarly, the defect information may include information related to a defect present in an image, and the defect classification may indicate the type of defect present in an image. Moreover, the noise quotient may indicate the level of noise present in an image. Similarly, the ROI may indicate an ROI of an image where a defect may be present.

Figure 5:
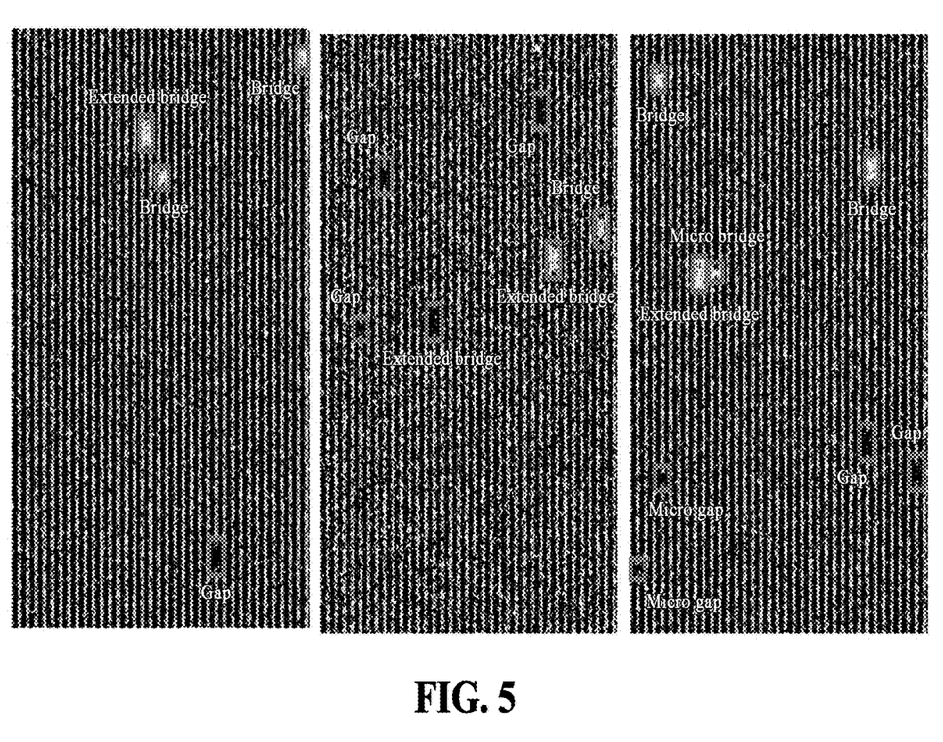
FIG. 5 illustrates example defect types.

FIG. 5 illustrates non-limiting examples of defect types. As illustrated in FIG. 5, these example defect types may include a line defect, a gap defect, a bridge defect, an extended bridge defect, an extrinsic defect, a native defect, and the like. For example, when a defect is a line defect, the defect information may include the location of the defect, line edge roughness, and the like. In an example, the defect information may also indicate whether a defect is present in an image.

Referring to FIG. 1, in operation 105, the method 100 may include selecting, using the MLM (e.g., the MLM 212 or the MLM 305), a first set of images among the received plurality of images, based on at least one of the plurality of image properties. In particular, the MLM 212/305 may select the first set of images from the plurality of images received by the receiving model 210. For example, when some of the received images have defects, the MLM may select those images from the plurality of images based on image properties. Referring to FIG. 3, a block 307 may represent one image among the first set of images. As illustrated by the block 307, the image may have a defect in a highlighted region 307a. Furthermore, each of the first set of images is suitable for super resolution (SR), which may be referred to as a super-resolution upscaling operation. Such a super-resolution upscaling operation may be performed on only the selected set of images and not on all images captured of an object by a sensor. In an example, the MLM 212/305 may determine whether each of the first set of images is suitable for SR when a value of the at least one of the plurality of image properties is greater than a predetermined threshold. For example, this may be the case in which a value of a noise quotient associated with an image among the first set of images is greater than the predetermined threshold. For example, the predetermined threshold associated with the noise quotient may be 5% of pixels affected by Gaussian noise. Accordingly, each image property may have a value and a corresponding predetermined threshold associated with the image property.

Thereafter, in operation 107, the method 100 may include recommending, using a recommendation model (e.g., the recommendation model 214), at least one image analysis model and at least one parameter, based on the at least one of the plurality of image properties. In particular, the recommendation model 214 may recommend at least one image analysis model to be used on the first set of images based on at least one image property, such as defect classification. For example, when a defect is a line defect, a line defect analysis model may be recommended. Furthermore, the recommendation model 214 may recommend at least one parameter based on at least one image property. In an example, the at least one parameter is an upscale factor. For example, the recommendation model 214 may recommend an upscale factor of 4 (e.g., an upsampling by a factor of 4) based on image scale information associated with an image in the first set of images. In an example, when the line defect is detected initially, the recommendation model 214 may suggest using a line edge roughness prediction model after resolution enhancement. Referring to FIG. 3, a block 309 may represent a recommendation provided by the recommendation model 214.

Then, in operation 109, the method 100 may include performing SR on at least one image among the first set of images, using the at least one parameter and the at least one of the plurality of image properties. In particular, the SR model 216 may perform SR on the image in the first set of images using an upscale factor and an image property. For example, the SR model 216 may upscale an image by a factor of 4 based on image scale information. Referring to FIG. 3, a block 311 may represent the SR model 216 and a block 313 may represent an output of SR.

Furthermore, the in-depth analysis model 218 may perform in-depth analysis on at least one super-resolution images generated by the SR model 216, respectively from the at least one image among the first set of images, or on the at least one image among the first set of images using at least one recommended image analysis model. In particular, when the recommendation model 214 recommends a line defect analysis model, the in-depth analysis model 218 may perform in-depth analysis on a line defect in the at least one image.

Hence, the plurality of images is screened such that a single MLM may identify images for performing SR by identifying all defects present in the images from low-resolution images. Therefore, different models for screening images for performing SR are not required for each of the images. In addition, each of the images is not required to be converted into a high-resolution image, thereby saving cost and resources. Accordingly, the present disclosure allows simultaneous defect classification and scale prediction, thereby saving time and reducing manual intervention. Thus, as non-limiting examples, one or more embodiments may provide one or more of the following non-limiting advantages:

enabling parallelizing of the screening process;
minimizing latency and memory usage by deploying an MLM across multiple tasks;
providing reliable SR;
saving time; and/or
reducing manual intervention, among other or alternative advantages.

Furthermore, it should be noted that the super-resolved images obtained after performing SR in accordance with the techniques described in the present disclosure may be used in various applications such as for defect analysis, or adopted and customized for analysis in material science, for forensic inspection, and the like.

The processors, memories, electronic devices, and other apparatuses, devices, units, modules, and components described herein with respect to FIGS. 1-5 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RW, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method, the method comprising:
   a multitask learning model (MLM):
      determining at least one of a plurality of image properties related to each of a plurality of images having a resolution lower than a predefined threshold; and
      selecting, based on the at least one of the plurality of image properties, a first set of images among the plurality of images to each be respectively suitable for upscaling;
   recommending, using a recommendation model, at least one parameter based on the at least one of the plurality of image properties; and
   generating at least one super-resolution image by respectively performing a super-resolution upscaling operation on at least one image of the first set of images based on the at least one parameter and the at least one of the plurality of image properties.

2. The method of claim 1, wherein the plurality of image properties comprises image scale information, defect information, defect classification, a noise quotient, and a region of interest (ROI).

3. The method of claim 1, wherein the selecting further comprises respectively selecting each image of the first set of images in response to a corresponding value of the at least one of the plurality of image properties being greater than a predetermined threshold.

4. The method of claim 1, wherein the at least one parameter comprises an upscale factor.

5. The method of claim 1, further comprising:
   training the MLM using a training dataset comprising the plurality of image properties and a set of low-resolution test images.

6. The method of claim 1,
   wherein the recommending using the recommendation model further comprises:
   recommending at least one image analysis model based on the at least one of the plurality of image properties; and
   recommending the at least one parameter by performing in-depth analysis on the at least one image of the first set of images or the generated at least one super-resolution image, using the recommended at least one image analysis model to determine a characteristic of an object in the at least one image of the first set of images.

7. A non-transitory computer-readable storage medium storing instructions that, when executed by a processor, cause the processor to perform the method of claim 1.

8. An electronic device comprising:
   one or more processors configured to execute instructions; and
   one or more memoiesy configured to store the instructions,
   wherein the execution of the one or more processors configures the one or more processors to:
      determine at least one of a plurality of image properties related to each of a plurality of captured images having a resolution lower than a predefined threshold;
      select a first set of images from the plurality of images based on the at least one of the plurality of image properties;
      recommend at least one image analysis model and at least one parameter, based on the at least one of the plurality of image properties; and
      generate super-resolution images by respectively performing a super-resolution unscaling operation on only the first set of images, where the first set of images includes less than all of the plurality of images, based on the at least one parameter and the at least one of the plurality of image properties.

9. The electronic device of claim 8, wherein the one or more processors are further configured to respectively select each image of the first set of images in response to a corresponding value of the at least one of the plurality of image properties being greater than a predetermined threshold.

10. The electronic device of claim 8, wherein the at least one parameter comprises an upscale factor.

11. The electronic device of claim 8, wherein the one or more processors are further configured to train a multitask learning model (MLM) using a training dataset comprising the plurality of image properties and a set of low-resolution test images.

12. The electronic device of claim 8, wherein the one or more processors are further configured to:
   recommend at least one image analysis model based on the at least one of the plurality of image properties; and recommend the at least one parameter by performing in-depth analysis on the at least one image of the first set of images or the generated at least one super-resolution image, using the recommended at least one image analysis model to determine a characteristic of an object in the at least one image of the first set of images.

13. A system for screening a plurality of images for performing super-resolution, the system comprising:
one or more processors configured to execute instructions; and
one or more memories storing the instructions,
wherein the execution of the instructions configures the one or more processors to: use a multitask learning model (MLM):
determine at least one of a plurality of image properties related to each of a plurality of images having a resolution lower than a predefined threshold; and
select, based on the at least one of the plurality of image properties, a first set of images among the plurality of images to be respectively suitable for upscaling;
recommend, using a recommendation model, at least one parameter based on the at least one of the plurality of image properties; and
generate, using a super-resolution model, at least one super-resolution image respectively through performance of a super-resolution upscaling operation on at least one image among the first set of images based on the at least one parameter and the at least one of the plurality of image properties.

14. The system of claim 13, wherein the plurality of image properties comprises image scale information, defect information, defect classification, a noise quotient, and a region of interest (ROI).

15. The system of claim 13, wherein the one or more processors are further configured to respectively select each image of the first set of images in response to a corresponding value of the at least one of the plurality of image properties being greater than a predetermined threshold.

16. The system of claim 13, wherein the at least one parameter comprises an upscale factor.

17. The system of claim 13, further comprising:
a training model configured to train the MLM using a training dataset comprising the plurality of image properties and a set of low-resolution test images.

18. The system of claim 13, wherein the one or more processors are further configured to:
recommend at least one image analysis model based on the at least one of the plurality of image properties; and
recommend the at least one parameter by performing in-depth analysis on at least one image of the first set of images or the generated at least one super-resolution image, using the recommended at least one image analysis model to determine a characteristic of an object in the at least one image of the first set of images.

19. The electronic device of claim 8, wherein the plurality of image properties comprises image scale information, defect information, defect classification, a noise quotient, and a region of interest (ROI).

* * * * *